R. H. ROSENBERG.
STEERING AND DRIVING WHEEL FOR MOTOR VEHICLES.
APPLICATION FILED JUNE 10, 1911. RENEWED JAN. 16, 1914.
1,137,288.
Patented Apr. 27, 1915.
2 SHEETS—SHEET 2.
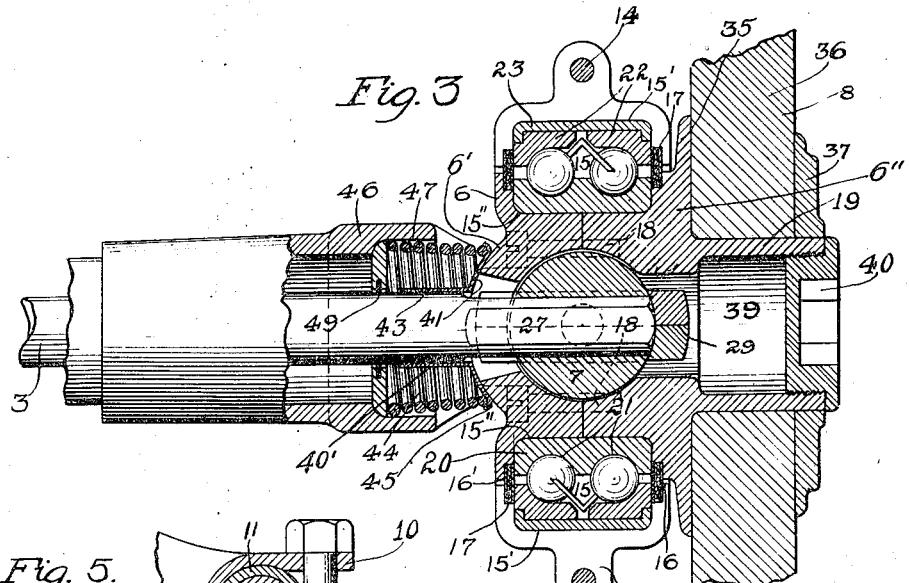
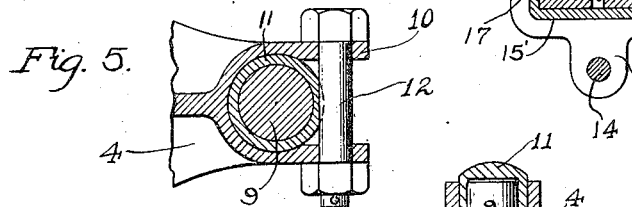
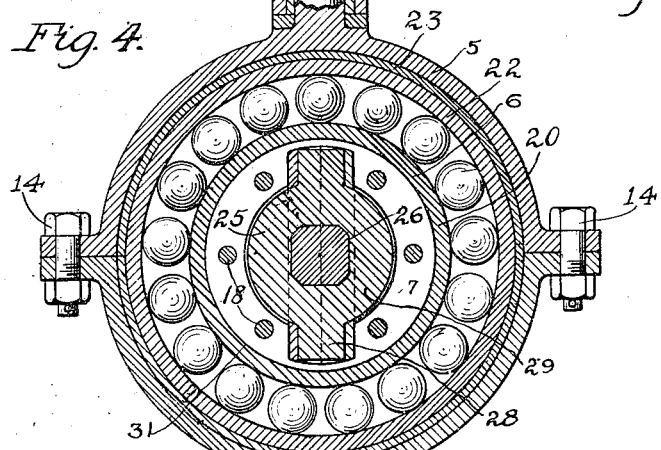
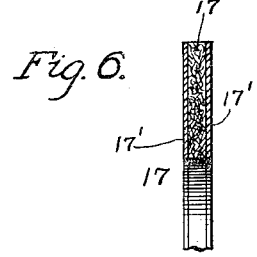
Witnesses
Robert McCreadie
Edward F. Wilson
Inventor
Ralph H. Rosenberg
by
Attorney.

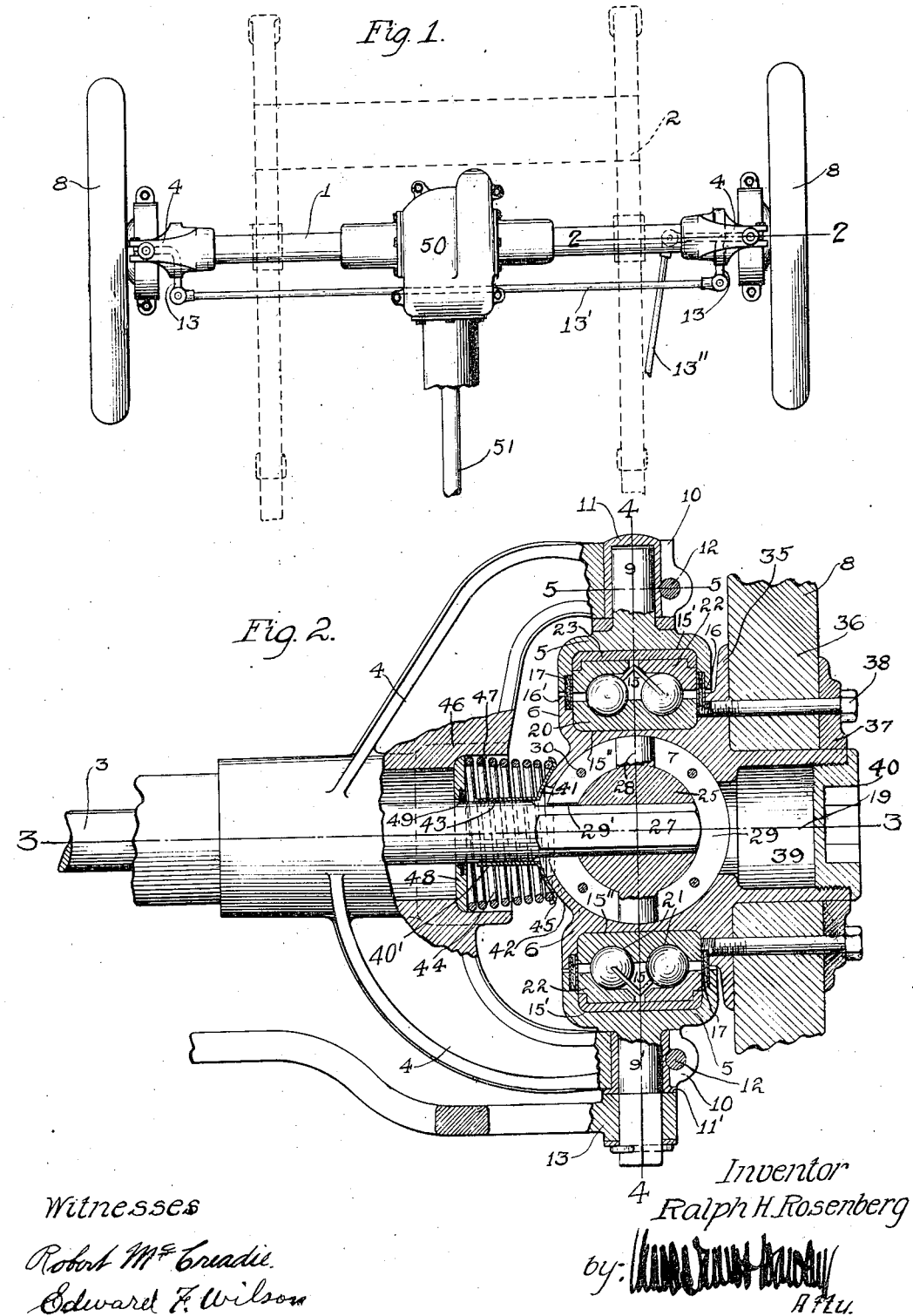

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

STEERING AND DRIVING WHEEL FOR MOTOR-VEHICLES.

1,137,288.      Specification of Letters Patent.      Patented Apr. 27, 1915.

Application filed June 10, 1911, Serial No. 632,491. Renewed January 16, 1914. Serial No. 812,586.

*To all whom it may concern:*

Be it known that I, RALPH H. ROSENBERG, a citizen of the United States, and a resident of Columbus, county of Franklin, and State of Ohio, have invented certain new and useful Improvements in Steering and Driving Wheels for Motor-Vehicles, of which the following is a full, clear, and exact description, such as will enable others skilled in the art to make and use the same.

My invention relates to improvements in motor vehicles and has particular reference to improvements in so-called front drive vehicles, by which term it is meant that the driving power of the engine is exerted upon the front wheels of the vehicle.

The object of my invention is to provide an improved power transmission device for use as a front driving mechanism which will permit the driving wheels of the automobile to be used also as steering wheels thereof.

My invention consists in the construction and in combination of parts, all as hereinafter described and particularly pointed out in the claims.

My invention will be more readily understood by reference to the accompanying drawings forming a part of this specification and in which:

Figure 1 is a plan view of a front axle of a motor driven vehicle or automobile, equipped with combined driving and steering wheel connections embodying my invention, the frame of the automobile being indicated by dotted lines; Fig. 2 is an enlarged sectional view of one of the combined connections on the line 2—2 of Fig. 1; Fig. 3 is a horizontal sectional view on the line 3—3 of Fig. 2; Fig. 4 is a vertical sectional view on the broken section line 4—4 of Fig. 2; Fig. 5 is an enlarged horizontal sectional view on the line 5—5 of Fig. 2; Fig. 6 is an enlarged detail sectional view of one of the oil retaining rings.

It will be at once understood that my novel driving and steering connections can be applied to both the front and rear axles of a vehicle or to only one of them. In the latter case I prefer to equip the front axle. In the drawings I have illustrated the relation between the front axle and the frame of the automobile by indicating the frame in dotted lines, but have not attempted to illustrate a complete motor vehicle, inasmuch as the location of the engine, the connection of the engine to the driving shaft within the axle, the mounting of the body upon the axle and such like features are well understood in the art.

In the drawings 1 represents the axle proper which is a stationary member, suitably connected to the frame 2, and the driving shaft 3 is rotatably mounted within this axle. At the ends of this axle are vertically positioned yokes 4, which are somewhat similar, though larger and stronger than the steering yokes in common use, for the purpose of accommodating my novel steering and driving connections. Said connections comprise three principal parts or members: the outer ring member 5, swivelly mounted in the yoke 4; the outer universal joint or socket 6, revolubly mounted within the outer ring member and swingable with it to steer the vehicle; and the ball or inner universal joint member 7 carried upon the outer end of the driving shaft to rotate therewith and mounted within the socket member 6. Said member 6 carries or has attached to it the wheel 8. The yoke embraces the outer ring member 5, and the ring is provided with trunnions 9 and 9' by which it is swivelly mounted in the yoke. The yoke has slotted bearings 10, the slots permitting the trunnions 9—9' to enter the bearings as the wheel is placed upon the shaft. The cylindrical bearing bushings 11 and 11' are provided, filling the space between the trunnions 9, 9' and the openings in the ends of the yoke and preventing the ring member 5 from being displaced once the parts have been assembled. The upper bushing 11 is capped on top to prevent the entrance of grit and dirt into the bearing. These bearings are entered into their positions endwise of the trunnions and are retained in position by the bearing bolts 12, the bushings being cut away to permit the entrance of the bolts which thereby prevent the bushings from being withdrawn and also preventing their rotation in the bearings. The lower trunnion 9' is extended below the bushing 11' and is squared to receive the crank arm 13 by which the ring 5 is swung to steer the vehicle. The crank arm 13 is retained in position upon the end of the trunnion by any suitable means and is connected to the opposite wheel by the link 13' and to the steering mechanism (not shown) of the automobile by the rod 13''. The ring member 5 is divided on a horizontal line into upper and lower parts to permit of its being assembled upon the other parts of the connection and the two parts are secured together by bolts 14. The outer universal joint or socket member 6 is rotatably mounted within said outer ring 5 upon a double ball bearing 15, the meeting faces of the two members being provided with registering annular grooves 15′ and 15″ to receive the bearing rings of the ball bearing. The meeting flanges 16 and 16′ of the two members, inclosing the bearing grooves, carry interlocking rings 17 which not only aid the ball bearings in connecting the two members to swing together, but also prevent dirt and grit from entering the space between the two members, and they retain the lubricant therein. These interlocking rings 17 are each built up of two thin metal plates 17′, and a felt or other suitable soft or absorbent ring 17″ between them. This outer universal joint member 6 is divided into two parts 6′ and 6″ on a medial line, that is, on a plane passing centrally between the two rings of balls of the ball bearing 15, and these two parts are secured together by the screw bolts 18. This construction not only permits the convenient manufacture of the two parts but also makes it easy to assemble them upon the ball bearing 15 and around the inner parts of the connection. The part 6″ has a central projection 19 forming the hub of the wheel, 8. The ball bearing 15 comprises an inner ring 20 mounted within the annular groove 15″ in the outer surface of the universal joint member 6, provided with two parallel ball grooves 21. The outer part of the ball bearing is formed of two similar bearing rings 22 mounted within the groove 15′ on the inner face of the ring member 5 and are carried in a flanged retaining ring 23. Each of these rings 22 is provided with a ball race corresponding with one of the ball grooves in the ring 20. The comparative large diameter of the ball bearing provides a bearing well adapted to withstand the strains of shocks incident to the running of the automobile, without undue friction or wear.

The inner universal joint member 7 comprises a ball 25 having a square hole 26 adapting it to be mounted upon the squared end 27 of the driving shaft 3. This ball 25 is provided with polarily-located pins or trunnions 28 arranged at right angles to the driving shaft and are carried in suitable bearings in a ring 29. The ring member 29 is divided or split to permit it to be assembled upon the trunnions 28, the two parts being held together by the rivets or bolts 30. This ring is mounted in a groove 31 provided therefor in the outer universal joint member 6 and can oscillate therein as the wheel revolves when it is swung to steer the vehicle. The ring member 29 is cut away at one side, providing the gap 29′ to permit the ring to pass the shaft when the connection swings upon the trunnions 28. The outer universal joint member 6 is also cut away at its inner side, as clearly shown in Figs. 2 and 3, to permit the necessary relative movement between this member and the shaft as the various parts of the connection swing upon their trunnions. The advantage of the ring member 29 is that it distributes the pressure of the pins or trunnions 28 giving a wide bearing for such pressure.

It will now be seen that the ball 25 can be readily entered upon or removed from the end of the driving shaft without resort to wrenches or other tools and, when in position upon the shaft, is rotated therewith. The ball member carries with it the ring 29 and the ring in turn rotates the outer universal joint member 6 upon the ball bearing 15, thus transmitting motion from the driving shaft to the wheel. It will also be clearly seen that when the outer ring member 5 is swung upon its trunnions it will swing with it the outer universal joint and the wheel carried thereby and thus affect the steering of the vehicle without in any way interfering with the rotative effect of the driving shaft. When the wheel is swung to guide the vehicle, and the shaft is rotating to propel the vehicle, the outer universal joint member 6 swings upon two axes, mounted at right angles to each other, one passing through the center of the trunnions 28 and the other centrally through the ring 29, and the relative movement between the ball 25, the ring 29 and the outer universal joint member 6, permitted by this construction, allows the wheel to be positioned to guide the vehicle without in any way interfering with the rotation thereof. The central projection 19, on the outer end of the member 6 upon which the wheel is mounted, is provided with an annular flange 35 and the spokes 36 of the wheel are clamped between this flange and a loose outer flange 37 by means of the hub bolts 38. Said projection 19 is provided with a central chamber 39 adapted to carry lubricant for the inner parts of the connection, and this chamber is closed at the outer end by means of a screw plug or nut 40.

To prevent the entrance of dirt and grit into the interior of the construction where it is cut away to permit of the relative movement of the shaft and the member 6, I provide a dust cap or cover 40′ formed out of sheet metal and which has a flange 41 conforming with the outer spherical surface 42 of the member 6, and is provided with a central cylindrical part 43 closely fitted to the driving shaft. This dust cap or cover is retained in position closely against the outer surface of the member 6 by means of a compression spring 44 mounted between the cap and the outer end of the yoke 4. The dust cap is provided with a turned edge or rim 45 to retain the end of the spring in position and the outer end of the hub 46 of the yoke is provided with a central chamber 47 to receive the inner end of the spring. At the bottom of the chamber 47 a washer or collar is provided adapted to prevent the entrance of dirt and grit into the hub of the yoke 4, and said washer 48 is provided with a felt ring 49 on its inner edge where it contacts with the driving shaft.

The axle 1 is provided with the usual differential connection 50 through which the power is transmitted to each of the wheels 8, from the engine shaft 51, and which permits the necessary difference of rotation of the wheels in turning corners.

While I have illustrated my novel connection as having the axis of the trunnions 9, 9' arranged vertically, it will be understood that this axis can be inclined outwardly, if desired, to produce the best steering effect without necessitating any radical change in the construction of the connection and without militating against the desirable functions. It will be seen that when it is desired to remove the movable parts of my connection with the wheel carried thereby from the vehicle, it can be done by simply taking out the clamping bolts 12. The wheel and the parts carried thereby will then slide freely off the end of the shaft and out of the slotted bearings of the yoke. It is thus seen that my novel driving and steering wheel connection is especially adapted for quick and easy replacing of a broken or damaged wheel by a good one whenever necessary.

My novel combined driving and steering connection is seen to be substantial and strong in all of its parts. Its peculiar construction enables it to be easily and quickly assembled; the inner moving parts can be run in lubricant and the dirt and grit is excluded, and finally the wheel with the attached movable parts can be easily removed from or replaced upon the vehicle with a minimum amount of work and without the necessity of making any close or fine adjustment of parts.

As many modifications of my invention will readily suggest themselves to those skilled in the art, I do not limit my invention to the structure as herein described.

Having thus described my invention, I claim as new and desire to secure by Letters Patent:

1. A steering and driving wheel for motor vehicles including, in combination, a suitable mounting permitting the wheel to oscillate horizontally, a socket member on the wheel provided with an annular groove, a ring oscillating in said groove, a driving member within said socket member and a swiveled connection between said ring and the driving member, substantially as described.

2. A steering and driving wheel for motor vehicles including, in combination, a suitable mounting permitting the wheel to oscillate horizontally, a socket member on the wheel provided with an annular groove, a ring oscillating in said groove, a driving member within said socket member, and polarily arranged pins on the driving member swivelly engaging said ring, substantially as described.

In testimony whereof, I have hereunto set my hand, this 3rd day of June, 1911, in the presence of two subscribing witnesses.

RALPH H. ROSENBERG.

Witnesses:
 RAY LOVELL,
 T. C. SCHMIDT.